(12) United States Patent
Wu

(10) Patent No.: US 7,878,568 B2
(45) Date of Patent: Feb. 1, 2011

(54) VERTICAL CARGO BOX EXTENDER FOR COMPACT PICKUP TRUCKS AND SIMILAR VEHICLES

(75) Inventor: Yitah R. Wu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 12/360,525

(22) Filed: Jan. 27, 2009

(65) Prior Publication Data

US 2010/0187849 A1   Jul. 29, 2010

(51) Int. Cl.
*B60R 11/00* (2006.01)
(52) U.S. Cl. .................... 296/37.6; 224/405
(58) Field of Classification Search .......... 296/3, 296/37.6, 37.14, 183.1; 21/195, 201; 224/405
See application file for complete search history.

(56) References Cited

U.S. PATENT DOCUMENTS

| | | | |
|---|---|---|---|
| 4,733,898 A | 3/1988 | Williams | |
| 5,476,301 A | 12/1995 | Berkich | |
| 5,615,922 A | 4/1997 | Blanchard | |
| 5,845,952 A | 12/1998 | Albertini et al. | |
| 5,897,154 A | 4/1999 | Albertini et al. | |
| 5,927,783 A | 7/1999 | Baka | |
| 5,941,589 A | 8/1999 | Perlman et al. | |
| 6,102,474 A | 8/2000 | Daley | |
| 6,142,549 A | 11/2000 | Clare et al. | |
| 6,283,526 B1 | 9/2001 | Keough et al. | |
| 6,371,719 B1 | 4/2002 | Hildebrandt | |
| 6,471,277 B1 | 10/2002 | Scensny et al. | |
| 6,485,077 B1 | 11/2002 | Foster et al. | |
| 6,499,795 B2 | 12/2002 | Clare | |
| 6,644,704 B1 | 11/2003 | Nyberg | |
| 2007/0029831 A1 | 2/2007 | Frasure et al. | |
| 2007/0108801 A1 | 5/2007 | Huotari et al. | |
| 2007/0158968 A1 | 7/2007 | Chandler et al. | |

*Primary Examiner*—Lori L Lyjak
(74) *Attorney, Agent, or Firm*—Gregory Brown; Price, Heneveld, Cooper, DeWitt & Litton, LLP

(57) ABSTRACT

A vehicle bed assembly includes a vehicle bed having a floor and first and second side walls, wherein the first and second side walls include a top portion with a cavity. At least one compartment is disposed below the floor of the vehicle bed. First and second rails are extendably received in the cavity of each of the first and second side walls, wherein the first and second rails are mounted in vertical tracks that provide for linear translation of the first and second rails between an extended position and a retracted position.

20 Claims, 6 Drawing Sheets

US 7,878,568 B2

VERTICAL CARGO BOX EXTENDER FOR COMPACT PICKUP TRUCKS AND SIMILAR VEHICLES

FIELD OF THE INVENTION

The present invention generally relates to a cargo box extender and more specifically to a vertical cargo box extender storage organizers and compartments for vehicle beds.

BACKGROUND OF THE PRESENT INVENTION

Vehicles that have large cargo areas including trucks and compact pickups are more versatile when the vehicle beds have storage compartments and additional support to secure cargo.

SUMMARY OF THE INVENTION

In one aspect of the present invention, a vehicle bed assembly includes a vehicle bed having a floor and first and second side walls, wherein the first and second side walls include a top portion with a cavity. At least one compartment is disposed below the floor of the vehicle bed. First and second rails are extendably received in the cavity of each of the first and second side walls, wherein the first and second rails are mounted in vertical tracks that provide for linear translation of the first and second rails between an extended position and a retracted position.

In another aspect of the present invention, a vehicle bed assembly includes a vehicle bed having a floor and first and second side walls, wherein the first and second side walls include a top side. A first rail is moveably connected with the first side wall and a second rail moveably connected with the second side wall, the first and second rails being operable between a raised position wherein a distal portion of the first and second rails extends above the top side, and a lowered position wherein the distal portion of the first and second rails does not extend above the top side.

In another aspect of the present invention, a vehicle bed assembly includes a vehicle bed having a floor and first and second side walls, wherein the first and second side walls include a top side. A first rail is rotatably connected with a first pivot device adjacent the first side wall and a second rail is rotatably connected with a second pivot device adjacent the second side wall, the first and second rails being operable between a raised position, wherein a distal portion of the first rail is rotated above the top side of the first side wall and a distal portion of the second rail is rotated above the top side of the second side wall, and a lowered position wherein the distal portion of the first rail is rotated below the top side of the first side wall and the distal portion of the second rail is rotated below the top side of the second side wall.

These and other features, advantages, and objects of the present invention will be further understood and appreciated by those skilled in the art upon studying the following specification, claims, and appended drawings.

DETAILED DESCRIPTION OF EMBODIMENTS

Figure 1:
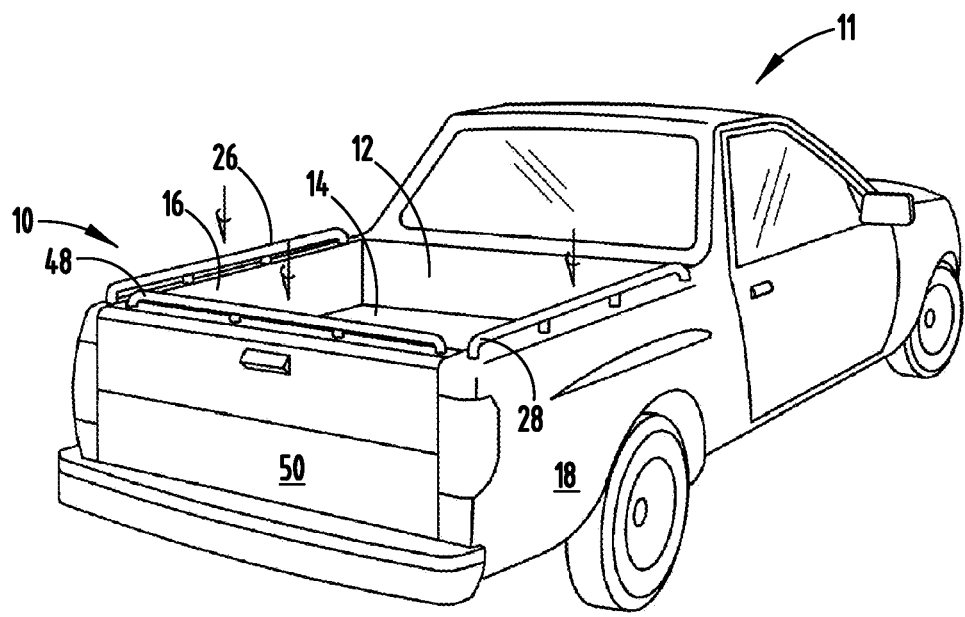
FIG. 1 is a top perspective view of a vehicle incorporating one embodiment of a vehicle bed assembly of the present invention.

For purposes of description herein the terms "upper," "lower," "right," "left," "rear," "front," "vertical," "horizontal" and derivatives thereof shall relate generally to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 7A:
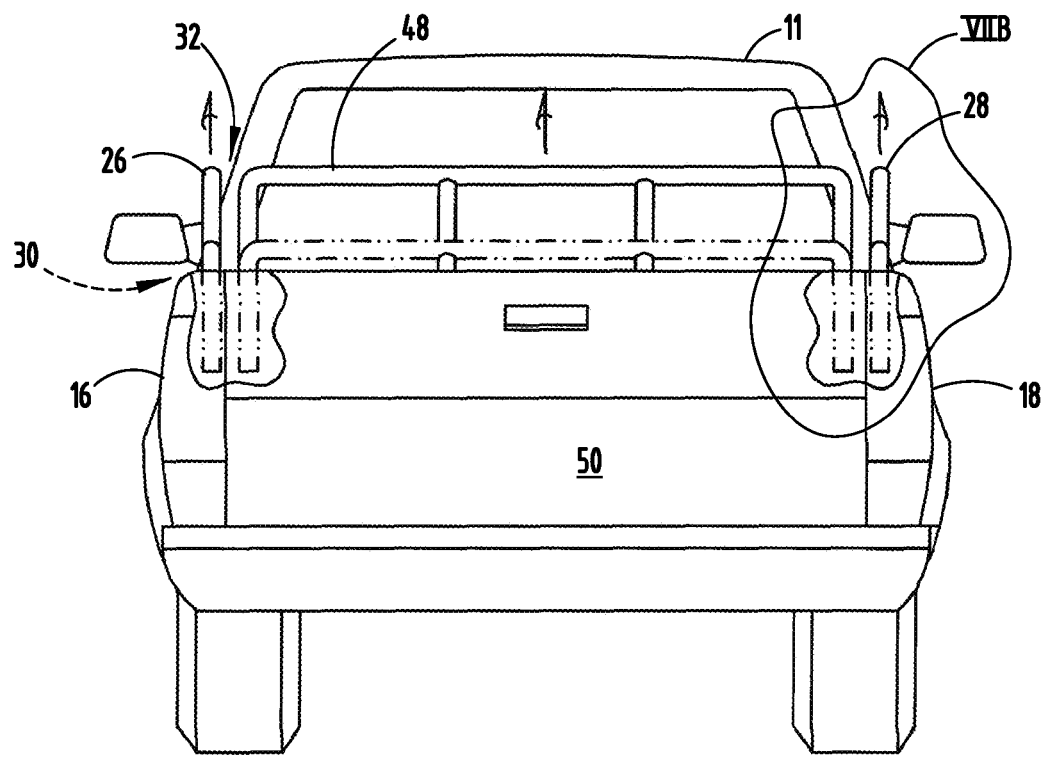
FIG. 7A is a rear elevational view of the vehicle of FIG. 1.
Figure 7B:
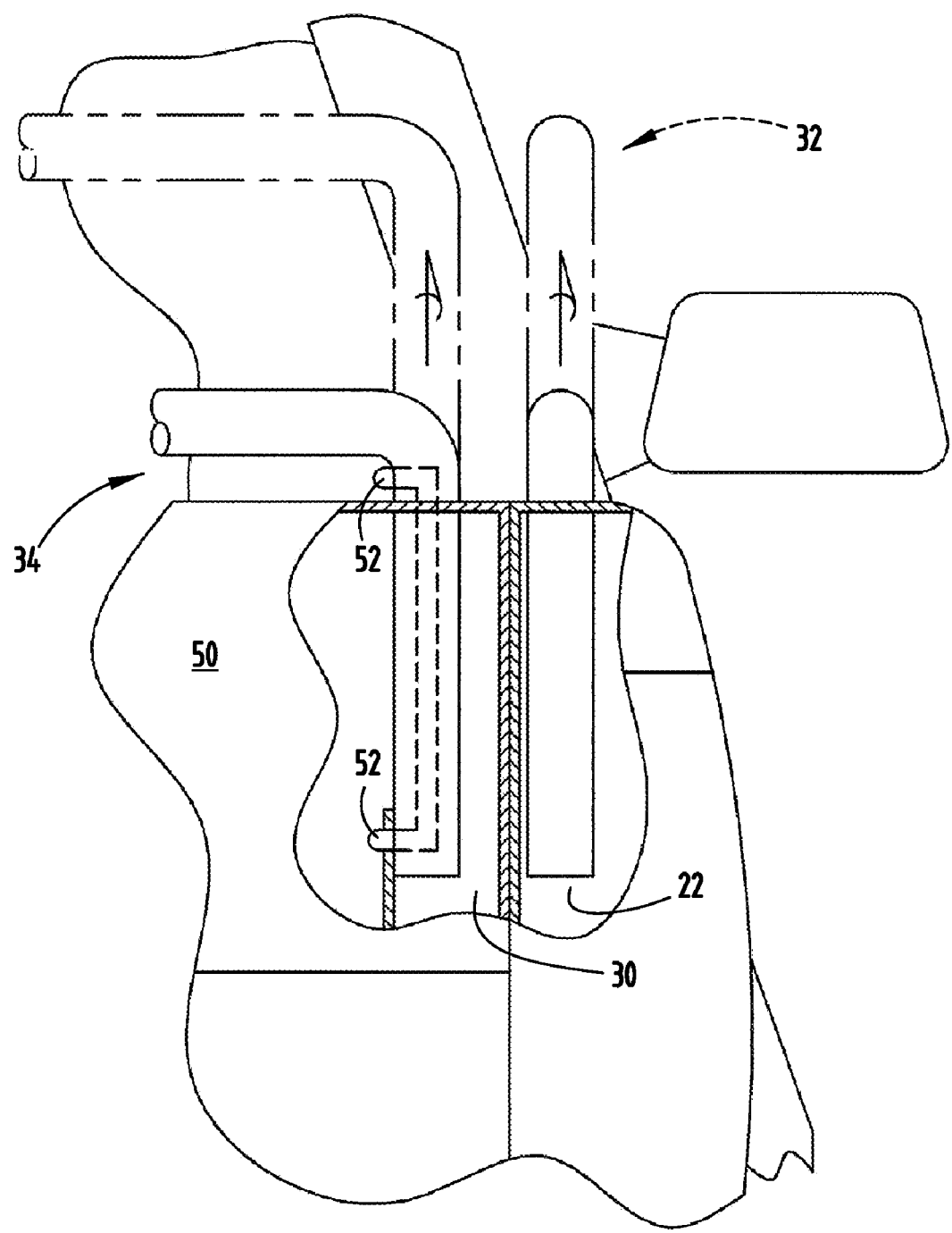
FIG. 7B is an enlarged view of the rail system of FIG. 7A taken at line VIIB.

Referring to FIGS. 1 and 7B, the reference numeral 10 generally designates a vehicle bed assembly on a vehicle 11 that includes a vehicle bed 12 having a floor 14 and first and second side walls 16, 18, wherein the first and second side walls 16, 18 include a top portion 20 with a cavity 22 (FIG. 7B). At least one compartment 24 is disposed below the floor 14 of the vehicle bed 12. First and second rails 26, 28 are extendably received in the cavity 22 of each of the first and second side walls 16, 18, wherein the first and second rails 26, 28 are mounted in vertical tracks 30 that provide for linear translation of the first and second rails 26, 28 between an extended position 32 and a retracted position 34, or any intermediate position therebetween.

Figure 2:
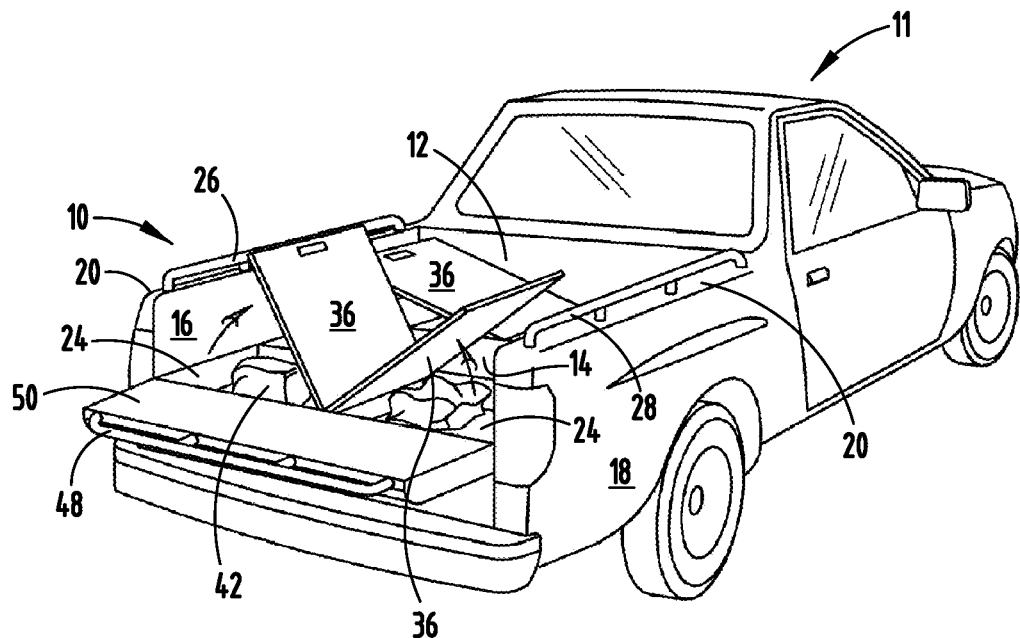
FIG. 2 is a top perspective view of the vehicle of FIG. 1 with the tailgate lowered and storage compartments open.
Figure 3:
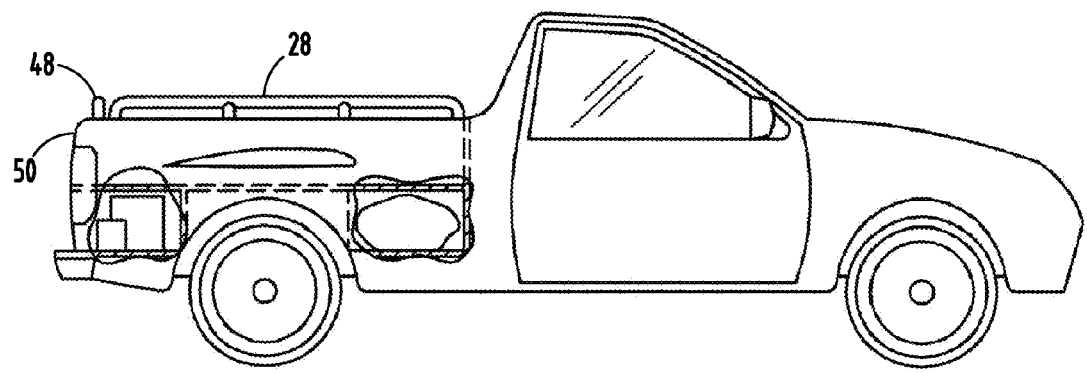
FIG. 3 is a side elevational view of the vehicle of FIG. 1 including hidden lines and with portions of the rear side panel of the vehicle bed removed.
Figure 4:
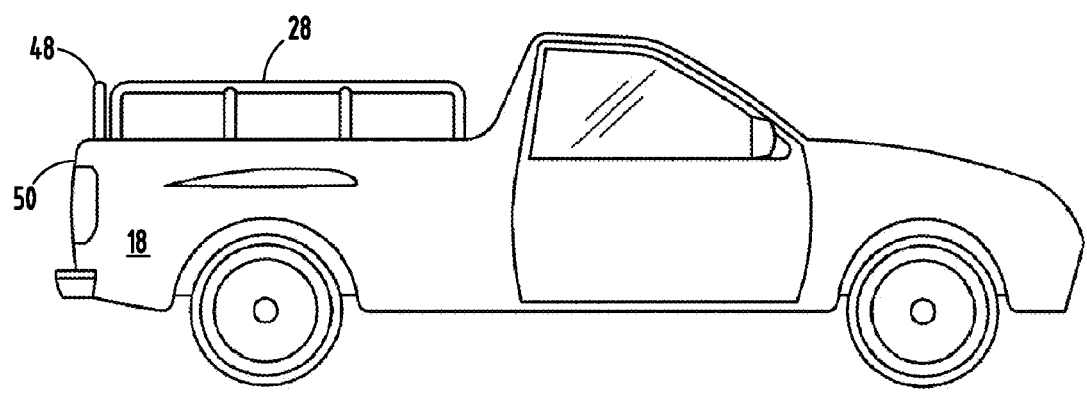
FIG. 4 is a side elevational view of the vertical rails in the raised position.

The illustrated embodiment of FIG. 2 includes multiple compartments 24 designed for storing cargo 42. The compartments 24 include covers 36 that rotate down into secure engagement with the vehicle bed 12 and which make up the floor 14 of the vehicle bed 12. It is contemplated that multiple compartments 24 could be provided or a single compartment 24. In addition, it is contemplated that the covers 36 over the compartments 24 can be connected in a variety of ways including hinges, slides, or be removed entirely from the vehicle bed 12 when cargo 42 is being secured in the compartments 24. The compartments 24 are located in front of and behind the rear axle of the vehicle 11. In addition, the floor 14 of the vehicle bed 12 is raised slightly to increase the overall capacity of the compartments 24. Accordingly, the depth of the vehicle bed 12 may be as shallow as 12-16 inches. The rails 26, 28 are disposed in the side walls 16, 18 of the vehicle bed 12 and therefore do not interfere with the compartments 24 when in the retracted position 34 (FIG. 3) or when in the extended position 32 (FIG. 4).

Figure 5:
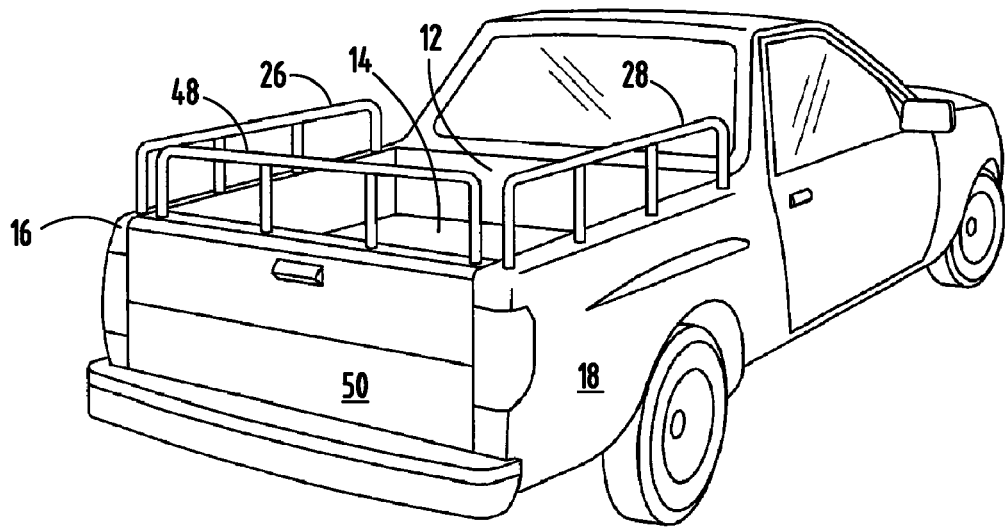
FIG. 5 is a top perspective view of the vehicle of FIG. 1 with the vertical rails in the raised position.
Figure 6:
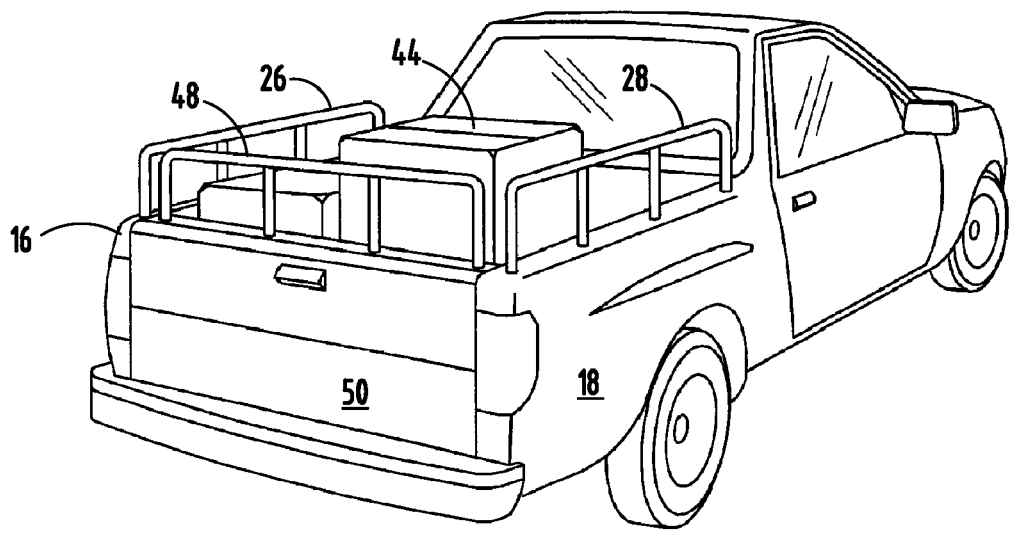
FIG. 6 is a top perspective view of the vehicle of FIG. 1 with the rails in the raised position and transporting cargo.

Referring now to FIGS. 5 and 6, the first and second rails 26, 28 in the side walls 16, 18 of the vehicle 11 are designed to be elevated to provide additional storage capacity in the vehicle bed 12 thus allowing larger cargo 44 to be placed in the bed 12. A third rail 48 may be disposed in a tailgate 50 to provide additional storage capacity to the vehicle bed 12. The third rail 48 in the tailgate 50 operates in the same manner as the first and second side rails 26, 28 disposed in the side walls 16, 18 of the vehicle bed 12. The first, second and third rails 26, 28 and 48 are collectively referred to as the rail system 51.

Referring now to FIGS. 7A and 7B, the vertical rails 26, 28, 48 are designed to linearly translate vertically in the vertical tracks 30 disposed in the tailgate 50, and first and second side walls 16, 18. A stop 52 may be provided that prohibits vertical translation of the rails 26, 28, 48 beyond a predetermined distance. Specifically, the stop 52 allows a given distance of travel of the first, second and third rails 26, 28, 48. The stops 52 minimize wear and tear on the vertical rails 26, 28, 48 and prevent the vertical rails 26, 28, 48 from being accidentally completely removed. It is contemplated that the rails 26, 28 and 48 may be raised and lowered manually or by a motorized or spring-loaded system as known in the art. It is also contemplated that the rails 26, 28, 48 can be locked in the extended position 32, or in the retracted position 34 for safety and convenience, or any intermediate position as so desired. Further, it is contemplated that the rails 26, 28, 48 could be walls, meshed screens, or any other barrier type structure. Further, the rails 26, 28, 48 may include tie down devices for accommodating straps to secure objects in the vehicle bed 12.

Figure 8:
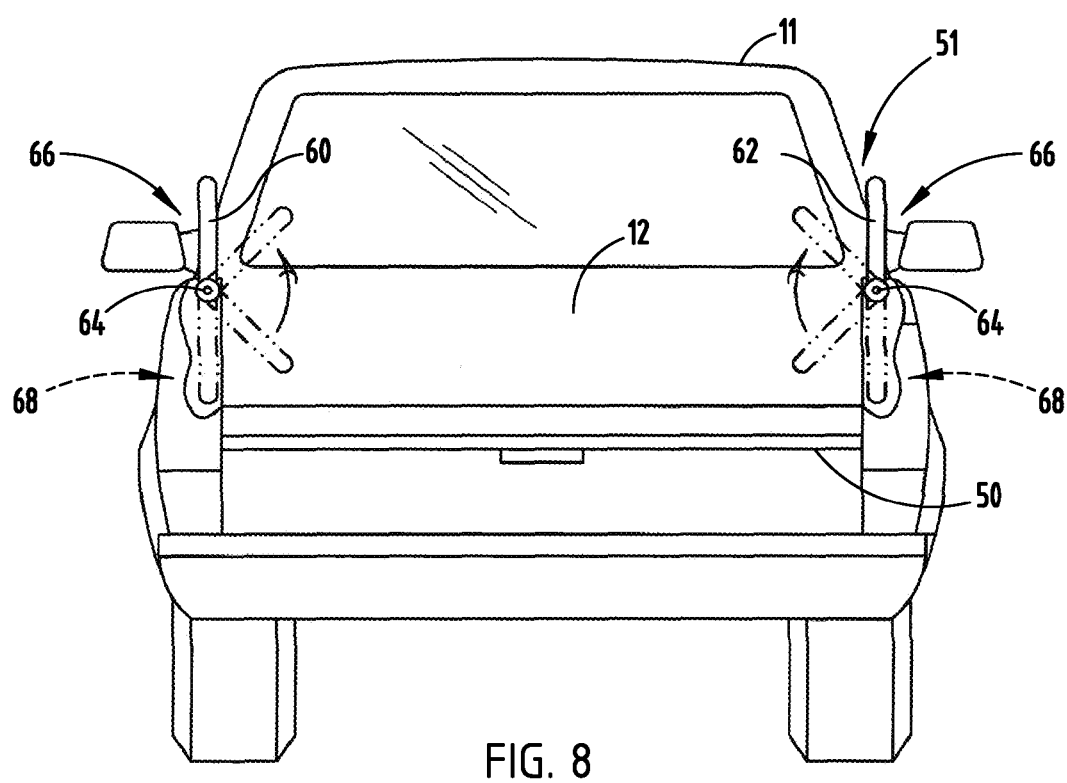
FIG. 8 is a rear elevational view of another embodiment of a vehicle bed assembly of the present invention.

Referring now to FIG. 8, another embodiment of a vehicle bed assembly of the present invention includes first and second side rails 60, 62 connected with a pivot pin 64 disposed on the top portion 46 of the side walls 16, 18. The first and second rails 60, 62 are designed for rotation 180 degrees between raised and lowered positions 66, 68. In the lowered position, the first and second rails 60, 62 are disposed in the first and second side walls 16, 18 of the vehicle bed 12, respectively. To secure the first and second rails 60, 62 in the raised position, the first and second rails 60, 62 are rotated inwardly into the bed 12 of the vehicle 11 until the rails 60, 62 have once again reached a vertical orientation where they lock in place by a mechanical system as known in the art.

Figure 9:
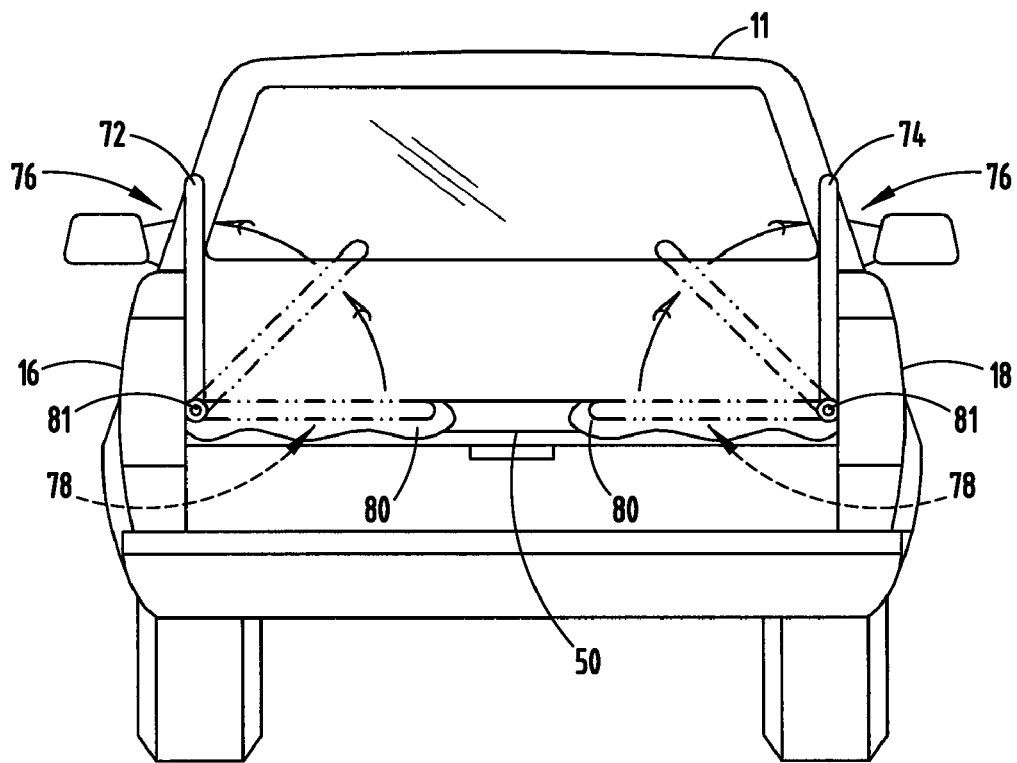
FIG. 9 is a rear elevational view of another embodiment of vehicle bed assembly of the present invention.

FIG. 9 illustrates yet another embodiment of a vehicle bed assembly 70 the present invention including first and second rotatable rails 72, 74 that rotate 90 degrees between extended and retracted positions 76, 78. The first and second rails 72, 74 are stored in the retracted position 78 in a recess 80 in the floor 14 of the vehicle bed 12. When in the retracted position 78, the top of the rails 72, 74, the planar extent of the rails 72, 74 are horizontally aligned and even with the floor 14 of the vehicle bed 12. The first and second rails 72, 74 are connected to a hinge pin 81 that allows the first and second rails 72, 74 to be rotated 90 degrees from the extended position 76 to the retracted position 78. When in the extended position 76, the first and second rails 72, 74 are inside the vehicle bed 12 and not disposed in the first and second walls 16, 18 of the vehicle bed 12. It is contemplated, however, that the hinge pin 81 could be recessed into the first and second side walls 16, 18 to allow rotation of the first and second rails 72, 74 to a raised position that is disposed inside the first and second side walls 16, 18, respectively.

Figure 10:
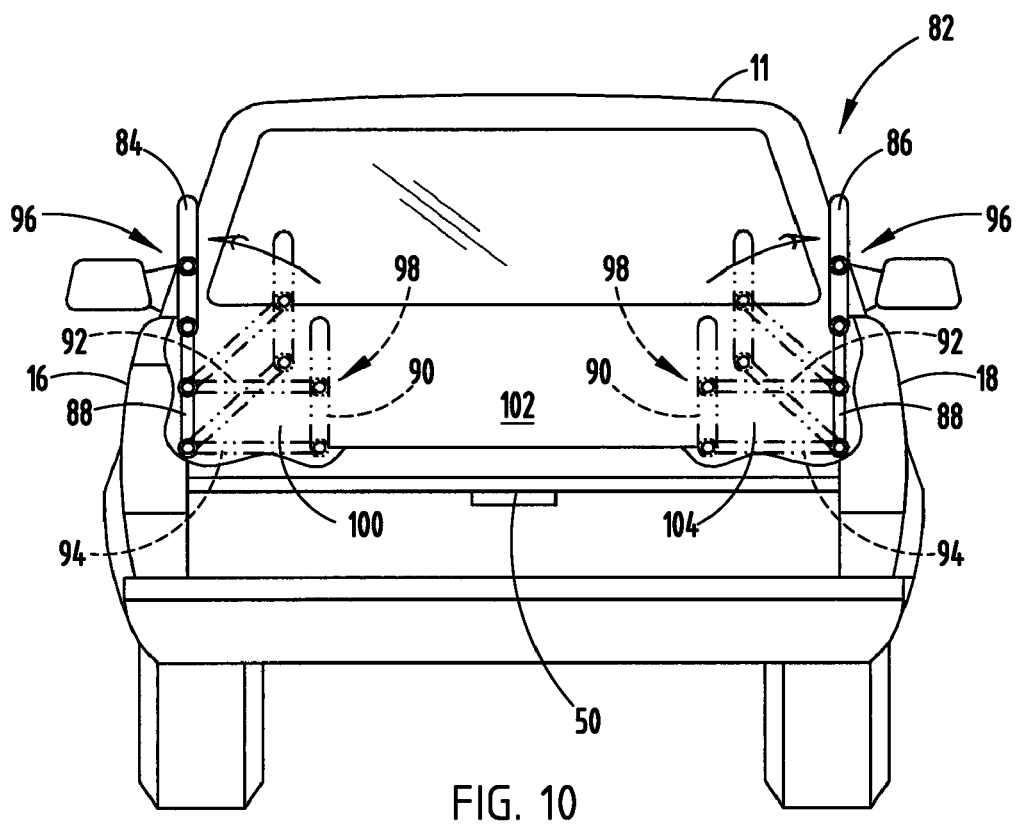
FIG. 10 is a rear elevational view of another embodiment of a vehicle bed assembly of the present invention.

FIG. 10 illustrates yet another embodiment of a vehicle bed assembly 82 of the present invention wherein first and second rails 84, 86 each include a static member 88 connected to a dynamic member 90 by first and second swing members 92, 94. The static member 88 of the first and second rails 84, 86 is disposed in the first and second side walls 16, 18, respectively, of the vehicle bed 12. In addition, the dynamic member 90 of the first and second rails 84, 86 are designed for rotation by the swing members 92, 94 between an extended position 96 and a retracted position 98. In the retracted position 98, the dynamic member 90 is vertically aligned but rests in the vehicle bed 12. In the extended position 96, the dynamic member 90 maintains vertical alignment and is positioned squarely above the static member 88. When in the retracted position, the dynamic member 90 serves as a cargo organizer that sections the vehicle bed 12 into three storage areas 100, 102, and 104. The cargo organizer provides support to items, for example groceries, preventing the groceries from shifting while the vehicle 11 is in motion.

The above description is considered that of the illustrated embodiments only. Modifications of the invention will occur to those skilled in the art and to those who make or use the invention. Therefore, it is understood that the embodiments showing the drawings and described above are merely for illustrative purposes and not intended to limit the scope of the invention, which is defined by the following claims as interpreted according to the principles of patent law, including the Doctrine of Equivalents.

I claim:

1. A vehicle bed assembly, comprising:
    a vehicle bed having a floor and first and second side walls, wherein the first and second side walls include a top portion with a cavity;
    at least one compartment disposed below the floor of the vehicle bed; and
    first and second rails extendably received in the cavity of each of the first and second side walls, wherein the first and second rails are mounted in vertical tracks that provide for linear translation of the first and second rails between an extended position and a retracted position.

2. The vehicle bed assembly of claim 1, wherein at the at least one compartment includes first and second compartments disposed at a rear portion of the vehicle bed.

3. The vehicle bed assembly of claim 1, wherein the rails are spring loaded.

4. The vehicle bed assembly of claim 1, wherein the rails are connected to a motorized device that moves the rails between the extended and retracted positions.

5. The vehicle bed assembly of claim 1, further comprising a tailgate having a tailgate rail extendably received therein.

6. The vehicle bed assembly of claim 1, wherein the floor includes doors that hinge open from a center portion of the floor of the vehicle bed.

7. A vehicle bed assembly, comprising:
    a vehicle bed having a floor and first and second side walls, wherein the first and second side walls include a top side;
    a first rail moveably connected with the first side wall; and
    a second rail moveably connected with the second side wall, the first and second rails being operable between a raised position wherein a distal portion of the first and second rails extends above the top side, and a lowered position wherein the distal portion of the first and second rails does not extend above the top side.

8. The vehicle bed assembly of claim 7, wherein the first and second rails are disposed below the floor of the vehicle bed in the lowered position and extend vertically above the top portion of the side walls in the extended position.

9. The vehicle bed assembly of claim 7, wherein the first and second rails are connected with first and second swing members, respectively, that rotate the first and second rails between the raised and lowered positions.

10. The vehicle bed assembly of claim 7, wherein the first and second rails are stored below the floor of the vehicle bed when in the lowered position.

11. The vehicle bed assembly of claim 7, further comprising
a first pivot device rotatably connected to the first rail; and
a second pivot device rotatably connected to the second rail.

12. The vehicle bed assembly of claim 11, further comprising:
a first cavity disposed in the first side wall and a second cavity disposed in the second side wall, wherein the first rail is rotated into the first cavity when in the lowered position and the second rail is rotated into the second cavity when in the lowered position.

13. The vehicle bed assembly of claim 7, wherein the rails are spring loaded.

14. The vehicle bed assembly of claim 7, wherein at the at least one compartment includes first and second compartments disposed at a rear portion of the vehicle bed.

15. A vehicle bed assembly, comprising:
a vehicle bed having a floor and first and second side walls, wherein the first and second side walls include a top side;
a first rail rotatably connected with a first pivot device adjacent the first side wall; and
a second rail rotatably connected with a second pivot device adjacent the second side wall, the first and second rails being operable between a raised position wherein a distal portion of the first rail is rotated above the top side of the first side wall and a distal portion of the second rail is rotated above the top side of the second side wall, and a lowered position wherein the distal portion of the first rail is rotated below the top side of the first side wall and the distal portion of the second rail is rotated below the top side of the second side wall.

16. The vehicle bed assembly of claim 15, wherein the first and second pivot devices are adjacent the floor.

17. The vehicle bed assembly of claim 15, wherein the first and second rails are connected with first and second swing members, respectively, that rotate the first and second rails between the raised and lowered positions.

18. The vehicle bed assembly of claim 15, wherein the first pivot device is proximate a top end of the first wall and the second pivot device is proximate a top end of the second wall.

19. The vehicle bed assembly of claim 15, further comprising:
a first cavity disposed in the first side wall and a second cavity disposed in the second side wall, wherein the first rail is disposed in the first cavity when in the lowered position and the second rail is disposed in the second cavity when in the lowered position.

20. The vehicle bed assembly of claim 15, wherein the first and second rails are stored below the floor of the vehicle bed when in the lowered position.

* * * * *